Figure 1:
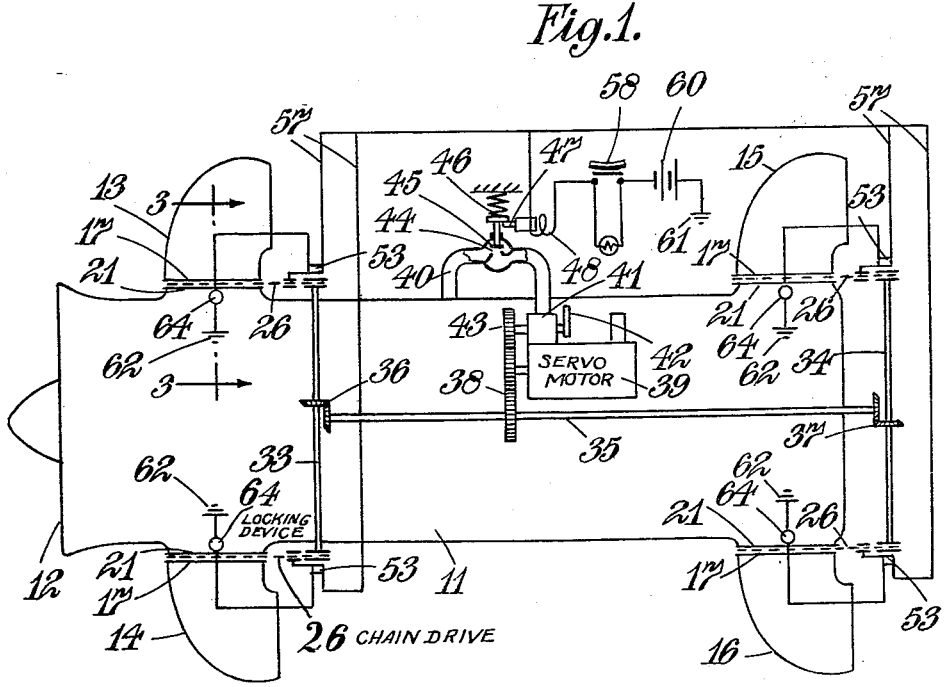

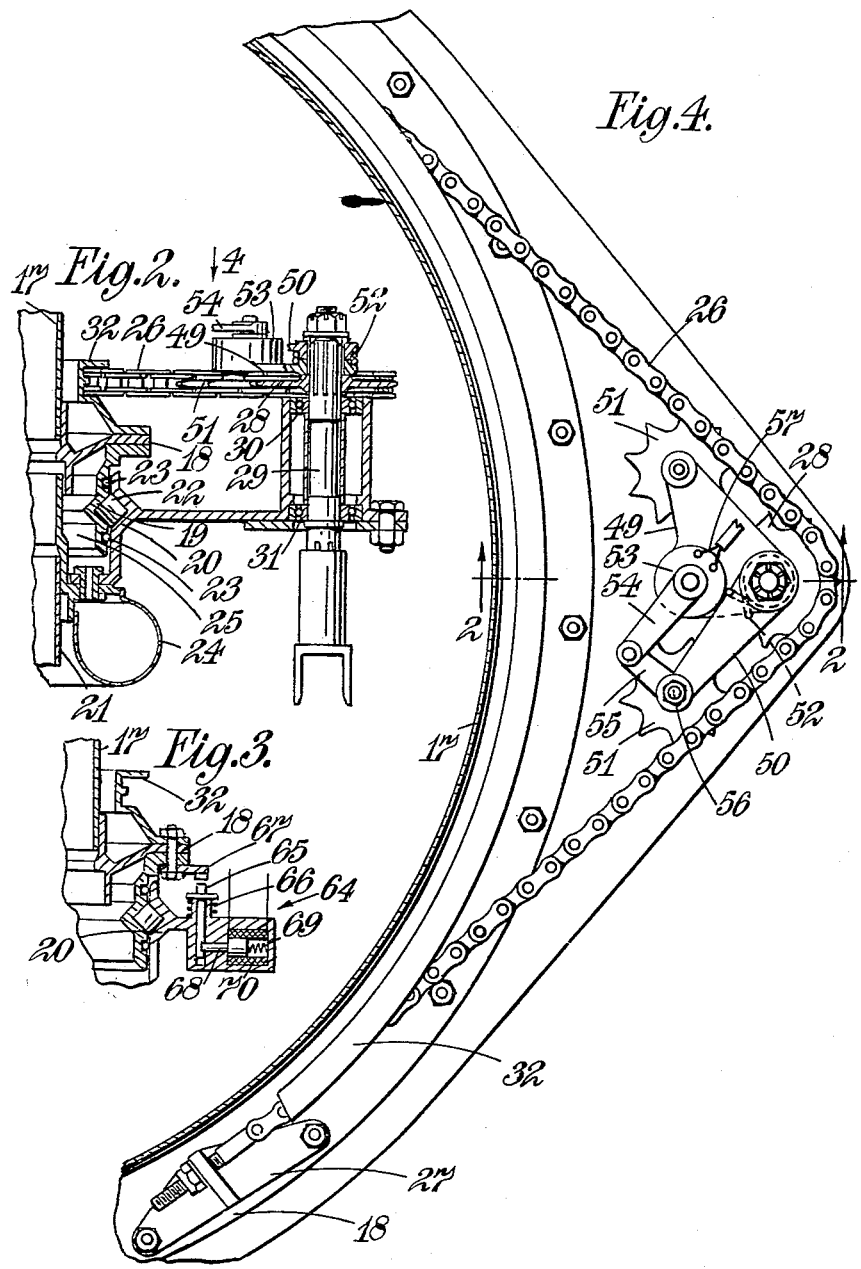

May 7, 1963 F. C. I. MARCHANT ETAL 3,088,275
AIRCRAFT JET PROPULSION POWER PLANTS
Filed Jan. 30, 1961 3 Sheets-Sheet 3

Inventors
F. C. I. MARCHANT
P. G. BATCHELOR
By Mawhinney + Mawhinney
ATTORNEYS

3,088,275
Patented May 7, 1963

3,088,275
AIRCRAFT JET PPROPULSION POWER PLANTS
Francis Charles Ivor Marchant and Percy George Batchelor, Bristol, England, assignors to Bristol Siddeley Engines Limited, Bristol, England, a British company
Filed Jan. 30, 1961, Ser. No. 85,831
Claims priority, application Great Britain Feb. 3, 1960
6 Claims. (Cl. 60—35.55)

This invention relates to jet propulsion power plants for aircraft.

According to this invention there is provided a jet propulsion power plant comprising a plurality of jet nozzles, means for adjusting the orientation of the jet discharged from each nozzle relative to the plant, co-ordinating control means adapted to co-ordinate the adjusting means associated with the respective nozzles to cause the orientation of the jets to be adjusted in unison, means for detecting loss of control of the adjusting means of any of the nozzles by co-ordinating control means and adapted, when such loss of control of a nozzle is detected, to actuate locking means preventing alteration of the orientation of the jet or jets discharged from the other nozzle or nozzles.

Preferably the detecting means is adapted, when such loss of control of a nozzle is detected, also to actuate locking means to prevent alteration of the orientation of the jet discharged from the nozzle of which control has been lost. In most cases it may be assumed that the reason for a jet orientation adjusting means not responding to the co-ordinating control means is that the adjusting means has become jammed, and in this way the locking means provides a safeguard against the possibility of the jamming becoming released.

In preferred arrangements the locking means, when actuated by the detecting means, acts to lock the co-ordinating control means in a manner to prevent adjustment of the orientation of the jet or jets as aforesaid.

In some arrangements the co-ordinating control means comprises a mechanical transmission interconnecting the orientation-adjusting means for the jets and the detection means is operated to actuate the locking means by relative movement of elements of the transmission consequent upon yielding or breakage of said elements. For example the transmission may comprise a part which is common to all the jet orientation adjusting means and, for each jet orientation adjusting means, a part which is individual thereto, the individual parts being so designed that in the event of a jet orientation adjusting means becoming jammed, the part individual thereto will yield or break before a yielding or breaking condition is reached in the common part, the detection means serving to detect yielding or breakage of the individual parts and being adapted on detection of such yielding or breakage to actuate the locking means. The common part of the transmission may comprise a drive shaft and the individual parts may each comprise a sprocket and chain drive, the sprockets being driven by the said drive shaft, and the detection means serving to detect breaking of the chain. Each chain may extend round an associated sprocket to form a V and the detection means may comprise a pair of members which are connected together and which are resiliently urged into contact with the chain at opposite sides of the sprocket such that yielding or breakage of the chain permits the two members to move relative to each other, such relative movement serving to actuate the locking means.

Conveniently the detection means is adapted also to provide a preliminary warning in the event of undue stretching of the chain.

Figure 5:
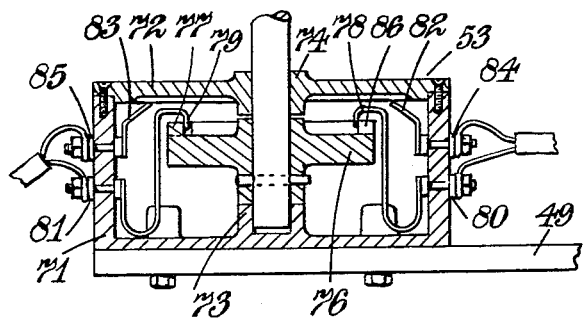
Figure 6:
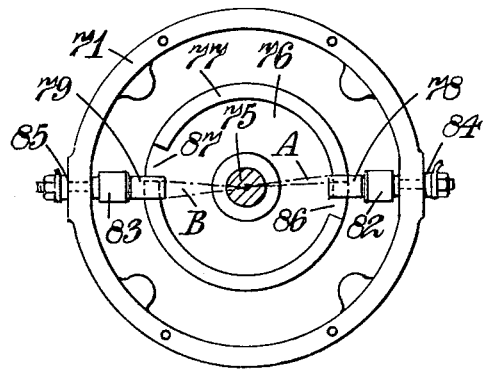
Figure 7:
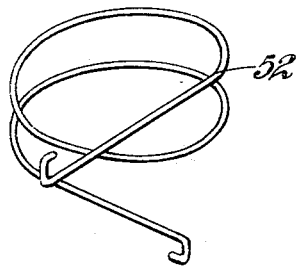

One embodiment of the invention will now be described by way of example with reference to the accompanying diagrammatic drawings in which:

FIGURE 1 shows a plan view of the arrangement,
FIGURE 2 is a sectional view on the lines 2—2 of FIGURE 4,
FIGURE 3 is a similar sectional part view through a locking device on a plane angularly displaced from that of FIGURE 2,
FIGURE 4 is a part sectional view of a nozzle and its adjacent sprocket viewed in the direction of the arrow 4 on FIGURE 2,
FIGURE 5 shows a sectional view of the switch in the plane of its operating spindle,
FIGURE 6 shows a plan view of the switch with the cover removed, and
FIGURE 7 shows the torsion spring on an enlarged scale.

The propulsion plant shown in FIGURE 1 comprises a main casing 11 housing a gas turbine engine including a compressor receiving air through an air intake 12 and arranged to discharge compressed air through two swivelling nozzles 13 and 14 and exhaust gas through two other swivelling nozzles 15 and 16. As best seen from FIGURE 2 the swivel part 17 of each nozzle is provided with a flange 18 carrying one of the races 19 of a swivel bearing the other race 20 of which is attached to the fixed part 21 of the nozzle. The races are of right-angle V-shape in cross section and house rollers 22 some of which are arranged with their axes at right angles to the axes of others of the rollers. Seals 23 prevent the escape of air or gas between the races, and in the case of hot gas nozzles the races may be kept cool by air from a manifold 24 blown into a space 25 between the races and the wall of the nozzle, the cooling air being at a slightly higher pressure than the gas passing the gap between the parts 17 and 21 of the nozzle. The nozzle is caused to swivel by a chain 26 attached at each end to an anchorage 27 (FIGURES 2 and 4) on the flange 18 and passing round a sprocket 28 on a stub shaft 29 journaled in bearings 30 and 31 carried by an extension from the fixed race 20. The chain is maintained spaced from the part 17 of the nozzle by a channel shaped guide 32 secured to the flange 18. This arrangement of a swivelling nozzle is described in the specification accompanying patent application No. 22,172, now Patent 3,010,770.

The shafts 29 of the four nozzles are interconnected by a mechanical transmisison system acting as a co-ordinating control means, the transmission comprising a shaft 33 splined to, and interconnecting the shafts 29 of the nozzles 13 and 14, a similar shaft 34 for the shafts 29 of the nozzles 15 and 16, and a shaft 35 connecting the shafts 33 and 34 by means of sets of bevel gears 36 and 37. The shaft 35 is driven through gearing 38 by an air motor 39 receiving air from a compressor of the engine through a pipe 40. Admission of air from the pipe 40 to the motor is controlled by a valve 41 provided with a pilot-operated control lever 42 and a follow-up drive 43 so that movement of the lever 42 from a datum position initiates a proportional number of revolutions of the shaft 35 also from a datum position. The angle of orientation of the swivelling nozzles is thereby made dependent upon the position of the pilot's control.

Should a fault develop in the bearing of one of the nozzles that nozzle may become so stiff to turn that the chain 26 is progressively stretched and will finally break. The chains are parts of the mechanical transmission which are individual to their respective nozzles, while the shaft 35 and the gearing 38 are parts which are common to all the nozzles, and the system is designed so that if a nozzle becomes jammed its chain will break before a breaking condition is reached anywhere in the remainder of the transmission. Since, on the breaking of one of the chains, the nozzle pertaining to it is probably jammed so as to be immovable of its own accord, essential action is limited to locking of the remaining nozzles. Where, as in the embodiment illustrated all the nozzles are operated by a common motive system it is preferable to proceed by cutting off the supply of motive fluid to the system. In most cases this will render the transmission system irreversible, but if not, additional means is provided for locking the system against reverse operation by the nozzles still connected to it.

As shown in section in FIGURE 1 a shut off valve 44 is provided in the pipe 40 conveying air to the motor 39. The valve comprises a closure member 45 urged to its closed position by a spring 46, and a latch 47 to hold the member in the open position, the latch being retractable by a solenoid 48.

Associated with each nozzle is a chain breakage detector comprising a pair of levers 49 and 50 journaled on an extension of the shaft 29 and each carrying an idling sprocket 51 meshing with the chain 26 on opposite sides of the driving sprocket 28. The idling sprockets are urged against the chain by a torsion spring 52 acting on the levers. The arrangement thus takes up any slack in the two runs of chain from the driving sprocket, by relative rotation of the levers, and if the chain breaks further relative rotation occurs. To detect and apply this further rotation a rotary switch 53 is mounted on the lever 49 and has a lever 54 fixed to its operating spindle and coupled by a link 55 to the idling sprocket spindle 56 of the lever 50. The switch essentially comprises a pair of electrical contacts which come together when breakage of the chain allows a predetermined relative rotation of the levers 49 and 50 to take place.

Referring now to FIGURES 5 to 7, the switch includes a cylindrical casing 71 and a detachable cover 72 provided respectively with bearing bosses 73 and 74 for the operating spindle 75. A disc 76 is attached to the spindle within the casing and has an upstanding rim 77 which normally holds two hairpin spring contact blades 78 and 79, mounted on the wall of the casing by terminal members 80 and 81, out of engagement with two other contact blades 82 and 83 mounted on the casing by terminal members 84 and 85. Two gaps 86 and 87 are formed in the rim 77 so that on the spindle being turned to positions predetermined by the placing of the gaps, the hairpin spring contact blades 78 and 79 are released and engage the contact blades 82 and 83.

The casing 71 and the spindle 75 are connected to the levers 49 and 50, carrying the idling sprockets 51, so that with normal chain tension the parts of the switch are in the positions shown in FIGURE 6. Stretching of the chain allows the angle between the levers 49 and 50 to increase under the action of the torsion spring 52, shown separately in FIGURE 7 on a larger scale, so that the switch disc 76 turns relatively to the casing. Stretching of the chain to the end of the safe limit turns the disc through an angle A such that the hairpin contact 78 is released and engages the contact 82. An electrical circuit is thereby established through a warning device, not shown, for indicating the existence of excessive slack in the chain. The pilot is thus warned of possible trouble. If the chain breaks, the angle between the levers 49 and 50 can increase still further, so that the disc 76 moves through an angle B sufficient to release the hairpin contact 79 for engagement with the contact 83. These contacts are in the circuit shown in FIGURE 1, so that their closure operates the solenoid 48 to cut off the air supply to the servo motor 39 and also operates the warning signal 59 and the locking device 64 of the nozzle having the broken chain.

One of the electrical contacts of the first mentioned pair of each of the four switches is connected by conductors 57 to one end of the operating coil of the air-shut-off solenoid 48. The other end of the operating coil is connected through a thermally operated intermittent circuit breaking switch 58, shunted by a warning lamp 59, to a source of electrical energy 60 having a ground return 61. The other electrical contacts of the four switches 53 may be connected directly to a ground return 62 in which case, on contact being made at one of the switches due to breaking of a chain 26 the solenoid 48 is operated so that the latch 47 is released, the air shut off valve 44 closes and the motor 39 and the mechanical transmisison system are locked to prevent swivelling of all the nozzles still free to turn. The current flowing in the solenoid circuit then causes the thermally operated switch 58 to open intermittently, with flashing of the warning lamp 59.

To take care of the possibility of the jammed nozzle becoming free after its chain has broken, the other electrical contacts of the four switches 53 may be connected to ground return 62 through operating coils 70 (FIGURE 3) of locking devices 64 for the individual nozzles. Thus, on closure of the contacts of a particular switch, the nozzle pertaining to that switch is locked by the locking device 64 and the other nozzles are locked by shutting off the supply of air to the motor 39.

As shown in FIGURE 3 the locking device 64 may comprise a bolt 65 sliding in a bore in an extension from the fixed race 20 and urged by a spring 66 towards a toothed quadrant 67 attached to the flange 18 of the swivelling part of the nozzle. The bolt 65 is normally kept withdrawn by a latch 68 held in position by a spring 69 and retractable by a solenoid coil 70 when the latter is energised on closing of the contacts of the switch 53 pertaining to the same nozzle.

We claim:

1. A jet propulsion power plant comprising a plurality of jet nozzles, means for adjusting the direction of the jet discharged from each nozzle relative to the plant, co-ordinating control means adapted to co-ordinate the adjusting means associated with the respective nozzles to cause the direction of the jets to be adjusted in unison, means for detecting loss of control of the adjusting means of any of the nozzles by co-ordinating control means and adapted, when such loss of control of a nozzle is detected, to actuate locking means preventing alteration of the direction of the jet or jets discharged from the nozzle or nozzles, said detecting means being adapted, when such loss of control of a nozzle is detected, also to actuate locking means to prevent alteration of the direction of the jet discharged from the nozzle of which control has been lost.

2. A jet propulsion power plant as claimed in claim 1, wherein the co-ordinating control means comprises a mechanical transmission interconnecting the direction-adjusting means for the jets and the detection means is operated to actuate the locking means by relative movement of elements of the transmission consequent upon yielding or breakage of said elements.

3. A jet propulsion power plant as claimed in claim 2, wherein the transmission comprises a part which is common to all the jet direction adjusting means and, for each jet direction adjusting means, a part which is individual thereto, the individual parts being so designed that in the event of a jet direction adjusting means becoming jammed, the part individual thereto will yield or break before a yielding or breaking condition is reached in the common part, the detection means serving to detect yielding or breakage of the individual parts and being adapted on detection of such yielding or breakage to actuate the locking means.

4. A jet propulsion power plant as claimed in claim 3, wherein the common part of the transmission comprises a drive shaft and the individual parts each comprise a sprocket and chain drive, the sprockets being driven by the said drive shaft, and the detection means serving to detect breaking of the chain.

5. A jet propulsion power plant as claimed in claim 4, wherein each chain extends round an associated sprocket and forms a V, and wherein the detection means comprises a pair of members, which are connected together and which are resiliently urged into contact with the chain at opposite sides of the sprocket such that yielding or breakage of the chain permits the two members to move relative to each other, such relative movement serving to actuate the locking means.

6. A jet propulsion power plant as claimed in claim 4, wherein the detection means is adapted also to provide a preliminary warning in the event of undue stretching of the chain.

References Cited in the file of this patent

UNITED STATES PATENTS

| | | |
|---|---|---|
| 2,432,678 | Platt | Dec. 16, 1947 |
| 2,731,094 | Hine | Jan. 17, 1956 |
| 2,866,315 | Schakel | Dec. 30, 1958 |
| 2,912,188 | Singlemann et al. | Nov. 10, 1959 |